Patented June 12, 1923.

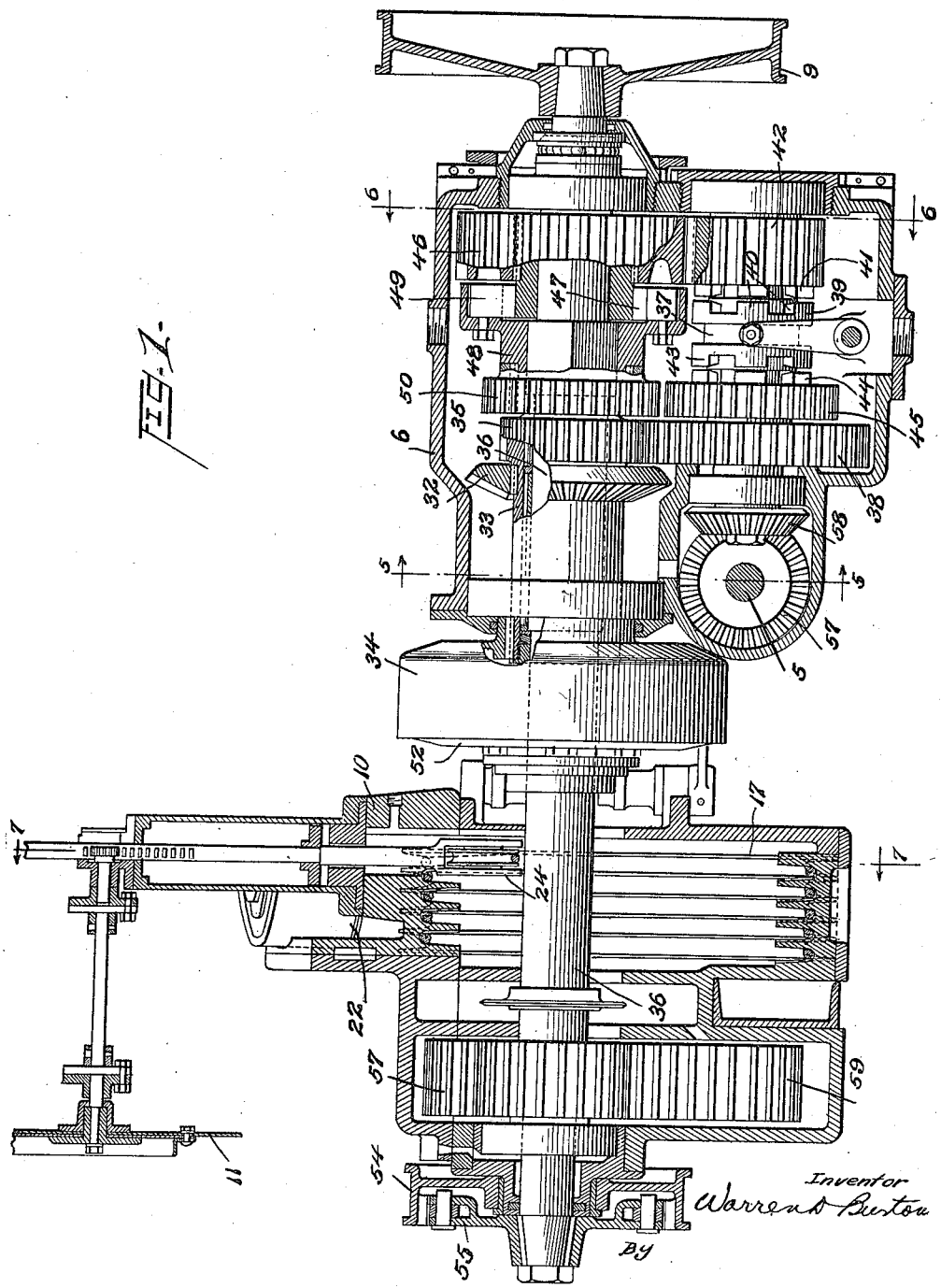

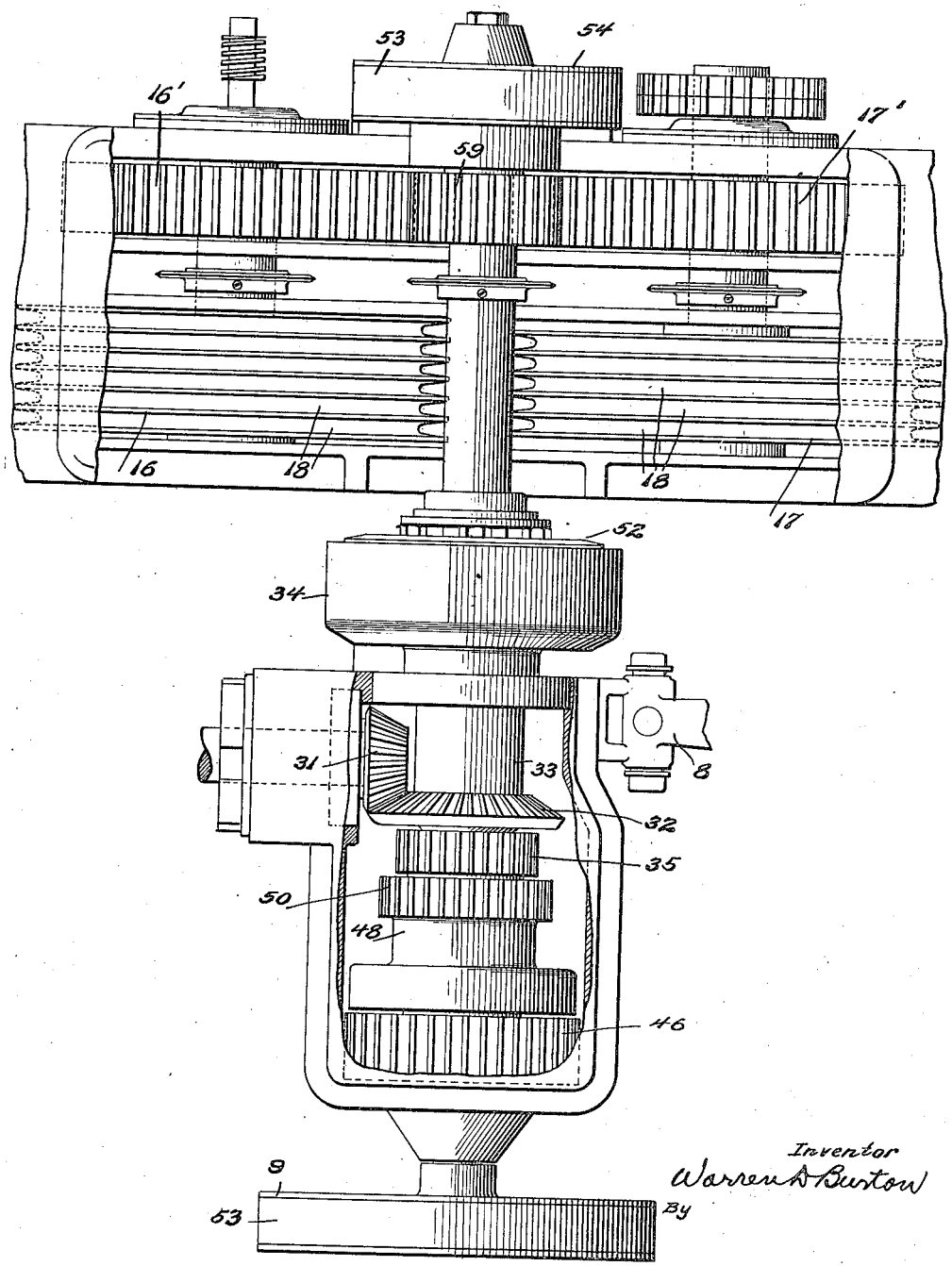

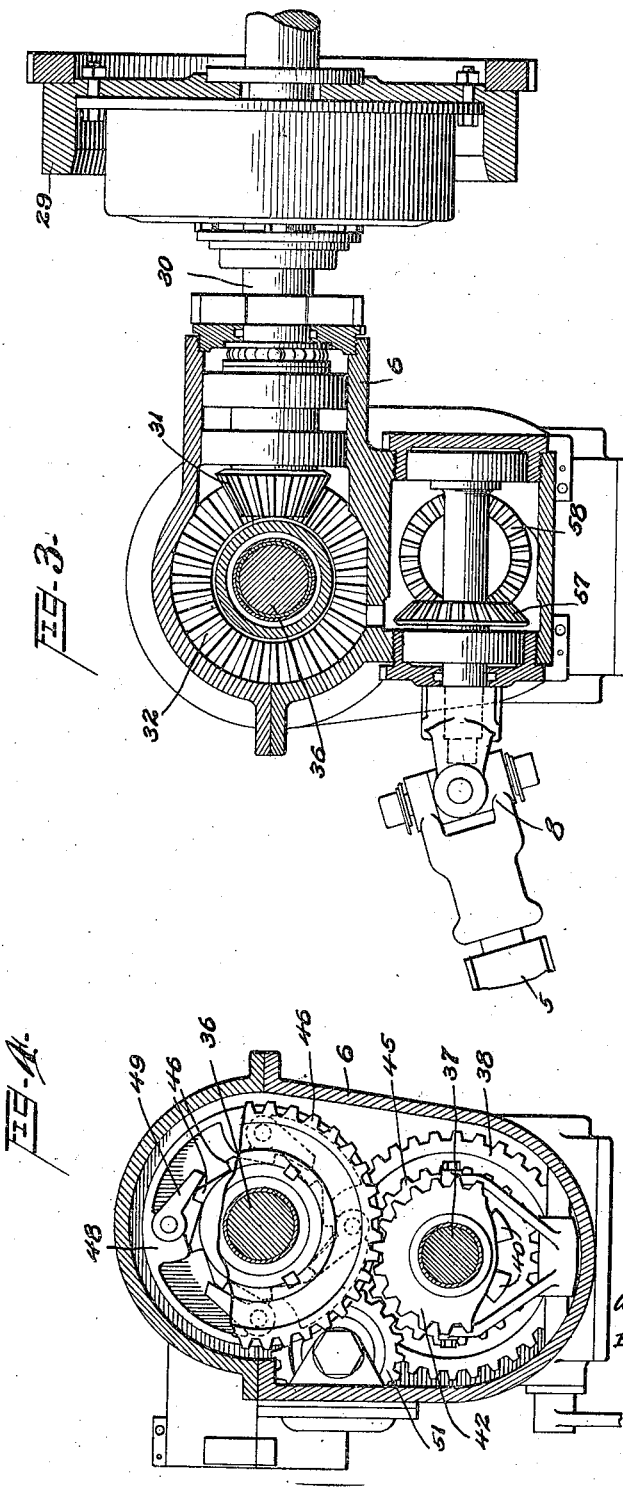

1,458,219

UNITED STATES PATENT OFFICE.

WARREN D. BURTON, OF OMAHA, NEBRASKA.

BALLOON WINDLASS.

Application filed September 18, 1920. Serial No. 411,075.

*To all whom it may concern:*

Be it known that I, WARREN D. BURTON, a citizen of the United States, residing at Omaha, in the county of Douglas and State of Nebraska, have invented certain new and useful Improvements in Balloon Windlasses, of which the following is a specification.

This invention relates in general to power transmissions and more particularly to a machine for changing speeds during load and without cessation of torque, such device being specifically adaptable to two-speed automobiles and balloon windlasses for controlling captive balloons.

The object of this invention is to provide means by which a balloon may be pulled down at a low speed at high torque or at low speed at a correspondingly low torque, the change being made from one speed to the other without declutching the transmission from the engine and without relieving load from the balloon cable. As applied to an automobile or truck, the machine may be started with a heavy load on a steep grade and after being in motion may be shifted into a high gear without danger of the vehicle slipping back during the change of gear.

With the foregoing and other objects in view, which shall appear as the description proceeds, the invention resides in the combination of parts and in the details of construction hereinafter described and claimed, the specific embodiment being illustrated in the accompanying drawings, in which:

Figure 1 is a vertical section through the transmission device.

Figure 2 is a plan view, partly broken away, of the transmission device.

Figure 3 is a section taken along line 5—5 of Figure 1.

Figure 4 is a section taken along line 6—6 of Figure 1.

Figures 1 and 2 also show a vertical section and plan view respectively of a part of the windlass winding mechanism with which this particular transmission is directly connected.

Referring more particularly to the drawings, the device consists of a gear case 6 which houses all the principal gears. A friction clutch 29 is mounted upon the flywheel of a gasoline engine. The clutch 29 however may be mounted in any convenient location between the source of power and the transmission. Shaft 30 is connected to the driver end of the friction clutch 29. A bevelled gear 31 is fixed on to and rotates as a unit with shaft 30. Shaft 36 is the main driving shaft of the transmission. Mounted upon shaft 36 but free to rotate thereon is a sleeve 33. Upon one end of the sleeve 33 is keyed or otherwise fixed a driving member of a friction clutch 34. Upon the other end of this sleeve 33 is keyed or otherwise firmly fixed a spur gear 35 and bevelled gear 32. Thus parts 33, 34, 32, and 35 rotate as a unit freely upon the shaft 36.

Bevelled pinion 31 meshes with and drives the bevelled gear 32. It will thus be seen that when the shaft 30 is caused to rotate, the sleeve 33, with its fixed parts will also rotate. Parallel with the transmission shaft 36 is placed a countershaft 37, upon which is keyed or otherwise fixed a gear 38. Gears 42 and 45 are also located on the countershaft 37 but free to rotate thereon. There is also mounted upon this shaft 37 a clutch 39 which is free to move longitudinally upon the said shaft 37, but fixed thereto with regard to rotation.

Clutch teeth 44 and 41 are arranged upon the respective sides of gears 42 and 45. Upon each end of the sliding clutch 39 are located teeth 40 and 43. By means of this clutch 39, gears 45 and 42 one at a time may be caused to rotate with the countershaft 37 and gear 38.

9 is a brake drum secured to shaft 36. 52 is a driven member of a friction clutch which is securely fixed to shaft 36. The operation of this transmission is as follows:

In order to start in low speed the clutch 39 is fixed so that clutch teeth 40 and 41 are in mesh. With the prime mover in motion the friction clutch 29 is slowly applied, thus gradually imparting the rotation of the prime mover to the shaft 30, and through gears 31 and 32, to the gear 35, and driving member of the friction clutch 34. Through gears 35 and 38, the countershaft 37 is rotated, imparting its motion through the sliding clutch 39 to the gear 42 which is meshing with gear 46 thus causing the latter to rotate in the same direction but at a considerably lower speed than members 34, 33, 32, and 35.

As ratchet 47 is firmly fixed to and rotates with gear 46, the ratchet imparts its rotation by means of the ratchet pawls 49 to the housing 48, which being firmly secured to the shaft 36 causes the latter to rotate at the same speed as gear 46; thus the power from the prime mover is imparted to the shaft 36 at a reduced speed but correspondingly increased torque.

The transmission is now in low gear, and in order to change therefrom to high gear, the friction clutch 34 and 52 is applied in the usual manner thus causing the shaft 36 to rotate in the same direction and at the same speed as the member 34, 33, 32, and 35. This action however does not change the speed of the ratchet 47 which still continues to rotate at its former speed. However, the housing 48 and pawls 49 are now rotating at a much greater speed than the ratchet 47. In other words, the pawls "over-run" the ratchet. Members 36 and 48 rotate in an anti-clockwise direction.

The transmission is now in high gear. It will be readily seen that as long as the prime mover is furnished power and shaft 30 is rotating, these operations may be repeated or reversed at will without the load or stopping the shaft 36.

However, this shaft could just as readily be connected to the driving mechanism of an automobile or truck or any other suitable type of machinery employing a transmission. Also the shaft 30 may be placed parallel with the shaft 36, and gears 31 and 32 may be spur gears instead of bevelled gears. Gears 57 and 58 are used as a secondary "power take-off" in this particular embodiment of the invention, 5 representing a take-off shaft having a universal joint 8.

When it is desired to rotate the shaft 36 in the reverse direction, clutch teeth 43 and 44 are brought into mesh and the power is then delivered from the countershaft 37 through the shaft 36.

Having thus described my invention, I claim:

1. In a changeable speed power transmission gearing, a main transmission shaft, a friction clutch member rotating therewith, a sleeve surrounding said shaft and free to rotate thereon, a friction clutch member on said sleeve adapted to engage the first named clutch member, a countershaft, gears on said sleeve and countershaft for transmitting motion from the sleeve to the countershaft, a ratchet wheel whose axis is in alinement with the axis of the main transmission shaft, a gear on and concentric with said ratchet wheel, a gear on the countershaft arranged to drive the gear on the ratchet wheel, and a pawl carried by the main transmission shaft adapted to cooperate with said ratchet wheel.

2. In a changeable speed power transmission gearing, a main transmission shaft, a friction clutch member rotating therewith, a sleeve surrounding said shaft and free to rotate thereon, a friction clutch member on said sleeve adapted to engage the first named clutch member, a countershaft, gears on said sleeve and countershaft, a ratchet wheel whose axis is in alinement with the axis of the main transmission shaft, a gear on and concentric with said ratchet wheel, a gear on the countershaft arranged to drive the gear on the ratchet wheel, clutch means for clutching and declutching connecting the last named gear on the countershaft, and a pawl carried by the main transmission shaft adapted to cooperate with said ratchet wheel.

3. In a changeable speed power transmission gearing, a main transmission shaft, a sleeve surrounding and rotatable on said shaft, speed ratio changing gears connecting said shaft and sleeve, means for directly clutching and declutching said shaft and sleeve, and overrunning clutch means between one of said gears and shaft permitting the speed of the main transmission shaft to be changed without demeshing said gears.

4. In a changeable speed power transmission gearing, a main transmission shaft, a sleeve surrounding and rotatable on said shaft, speed ratio changing gears connecting said shaft and sleeve, means for directly clutching and declutching said shaft and sleeve, and means permitting the speed of said shaft to be changed without cessation of torque.

5. In a changeable speed power transmission gearing, a main transmission shaft, a sleeve surrounding and rotatable on said shaft, speed ratio changing gears connecting said shaft and sleeve, means for directly clutching and declutching said shaft and sleeve, and means permitting the speed of said shaft to be changed without declutching the transmission gearing as a whole.

6. In a variable speed transmission, a prime mover, a primary shaft driven by the prime mover, a second shaft, a primary gear, a secondary gear in mesh with said primary gear, a third gear connected to said secondary gear, a fourth gear connected to said third gear, a shaft extending axially from said fourth gear and rigidly secured thereto, said shaft extending axially through said primary gear and constituting a support therefor, friction clutch means rigidly mounted to turn with said shaft, and secondary clutch means rigidly secured to said primary gear and concentric with same and said shaft and adapted to engage with said primary clutch means.

7. In a variable speed transmission, a prime mover, a primary shaft driven by said prime mover, a secondary shaft, a clutch mechanism between said primary and said secondary shaft, a primary gear, a secondary gear in mesh with said primary gear, a third gear connected to said secondary gear, a fourth gear connected to said third gear, a shaft extending axially from said fourth gear and rigidly secured thereto, said shaft extending axially through said primary gear and constituting a support therefor, friction clutch means rigidly mounted to turn with said shaft, and an axially extending sleeve projecting from said primary gear and a secondary clutch member rigidly secured to said sleeve and concentric with same and said shaft and adapted to engage with said primary clutch means.

In testimony whereof I affix my signature.

WARREN D. BURTON.